June 23, 1953     H. E. MEYER     2,643,188
METHOD OF PREPARING A PHOTOGRAPHIC THREE-DIMENSIONAL
GRAIN SCREEN AND FOR PRODUCING A PHOTOGRAPHIC
DRY PLATE HAVING A LATENT THREE-DIMENSIONAL
SCREEN PATTERN THEREON Filed Jan. 13, 1949     3 Sheets—Sheet 1

Inventor:
Herman E. Meyer
by his Attorneys
Howson & Howson

June 23, 1953     H. E. MEYER     2,643,188
METHOD OF PREPARING A PHOTOGRAPHIC THREE-DIMENSIONAL
GRAIN SCREEN AND FOR PRODUCING A PHOTOGRAPHIC
DRY PLATE HAVING A LATENT THREE-DIMENSIONAL
SCREEN PATTERN THEREON
Filed Jan. 13, 1949     3 Sheets-Sheet 2
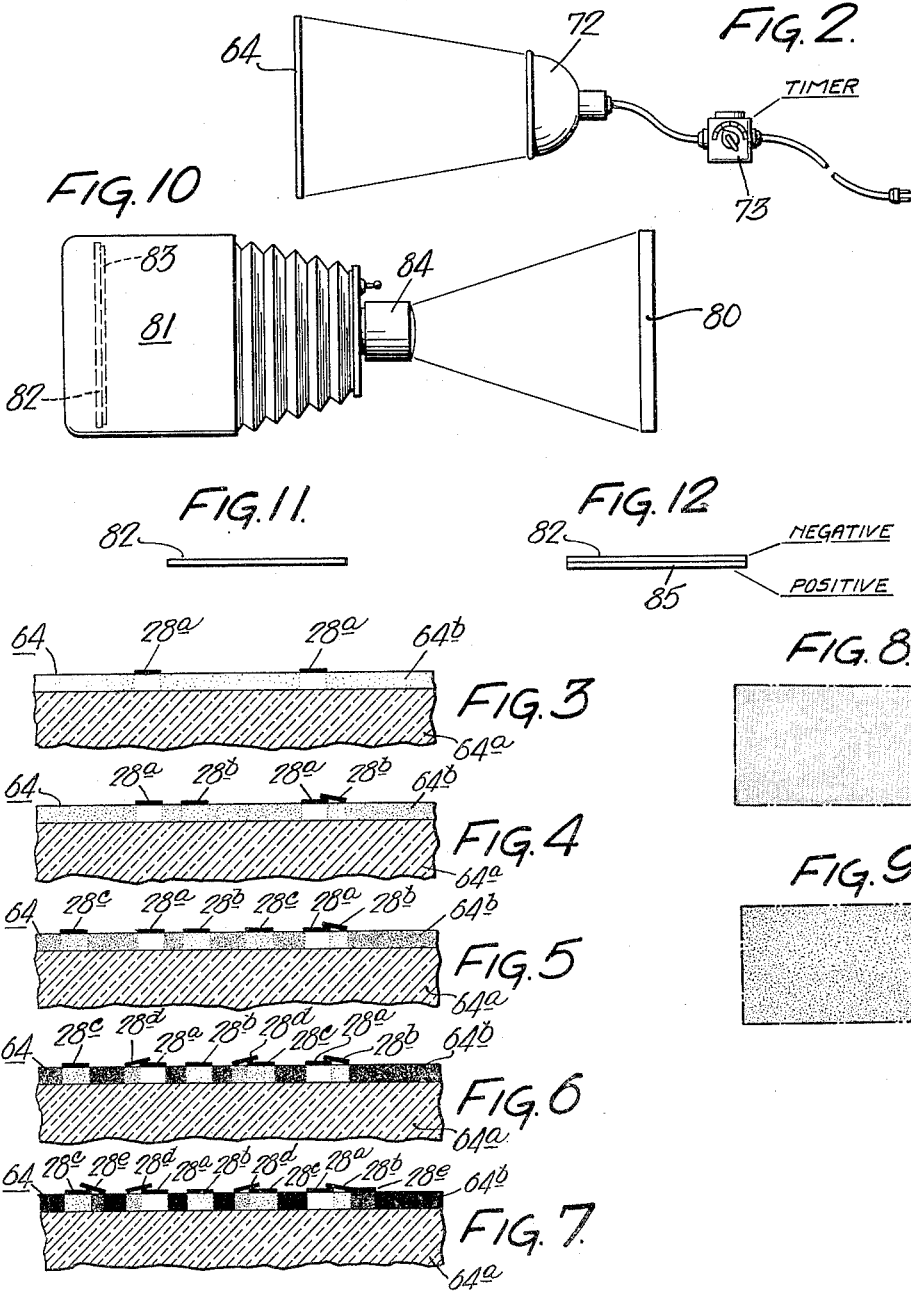
Inventor:
Herman E. Meyer
by his Attorneys
Howson & Howson June 23, 1953        H. E. MEYER        2,643,188
METHOD OF PREPARING A PHOTOGRAPHIC THREE-DIMENSIONAL
GRAIN SCREEN AND FOR PRODUCING A PHOTOGRAPHIC
DRY PLATE HAVING A LATENT THREE-DIMENSIONAL
SCREEN PATTERN THEREON Filed Jan. 13, 1949        3 Sheets-Sheet 3

Inventor:
Herman E. Meyer
by his Attorneys
Howson & Howson

Patented June 23, 1953

2,643,188

UNITED STATES PATENT OFFICE 2,643,188

METHOD OF PREPARING A PHOTOGRAPHIC THREE-DIMENSIONAL GRAIN SCREEN AND FOR PRODUCING A PHOTOGRAPHIC DRY PLATE HAVING A LATENT THREE-DIMENSIONAL SCREEN PATTERN THEREON

Herman E. Meyer, Elwood, N. J.

Application January 13, 1949, Serial No. 70,677

12 Claims. (Cl. 95—81)

This invention relates to an improved grain screen useful in the photographic reproduction art, the method for preparing this improved screen, and methods for using the screen in various photographic processes.

The conventional half-tone screen has been utilized for many years to enable reproductions giving differences in shade and color (in the case of a color reproduction). These differences in shading in copper plate reproduction are achieved by means of "two-dimensional" variation in the dots. Two-dimensional variation means that the area of the individual dot may be increased or decreased and/or the spacing of the dots with respect to each other may be increased or decreased to provide tones all the way from the darkest to the lightest shading. The above procedure is generally satisfactory for copper plate reproductions in photo-engraving. However, this procedure is relatively unsatisfactory with a "gravure" process which is known in the art as typified by the fact that all the dots are of the same size. In this process, the screen is printed onto the carbon tissue so that printed lines and open dots are obtained.

The improvement of the present invention may be referred to as the provision of a "three-dimensional" screen, since not only can the area and spacing of the dots be varied, but the intensity of the individual dots may be controlled so that half-tone dots of various densities may be effectively transferred to a copper cylinder by means of the conventional carbon tissue and etching process. In addition, high grade offset reproductions can be made by means of my improved grain screen per se, thereby eliminating the half-tone screen and dot entirely.

A primary object of the invention therefore, is to provide an improved grain screen in which the individual grain dots vary in density.

A further object of the invention is to provide methods for manufacturing such an improved grain screen.

A further object is to provide an improved photographic reproduction process utilizing my grain screen.

A still further object is to provide an improved grain screen and methods useful in the photographic color reproduction art.

A still further object is to provide a positive contact print which may be used to expose the carbon tissue employed in the conventional photogravure process and which may also be used in the offset reproduction process.

A further object is to provide a method in the photogravure art which eliminates the necessity for registering two positives on the carbon tissue.

Further objects will be apparent from the specification and drawings in which:

Fig. 2 is a schematic view showing a step in the preparation of the photographic plates and illustrates the exposure of these plates in conjunction with the structure of Fig. 1;

Figs. 3–7 show successive steps in the preparation of my improved screen, by means of the apparatus of Figs. 1 and 2;

Fig. 8 is a highly enlarged view of a portion of the area of a single dot in the grain screen produced by means of the invention and showing how the intensity of the dot area may be uniformly controlled;

Fig. 9 is the identical showing of Fig. 8 but illustrates the problems in reproducing and the previous method of solving them;

Fig. 10 is a diagrammatic representation showing a method of utilizing my improved screen;

Figs. 11 and 12 show the next steps in the process;

Fig. 14 represents the light area, Fig. 15 the medium area, and Fig. 16 the dark area.

Figure 1:
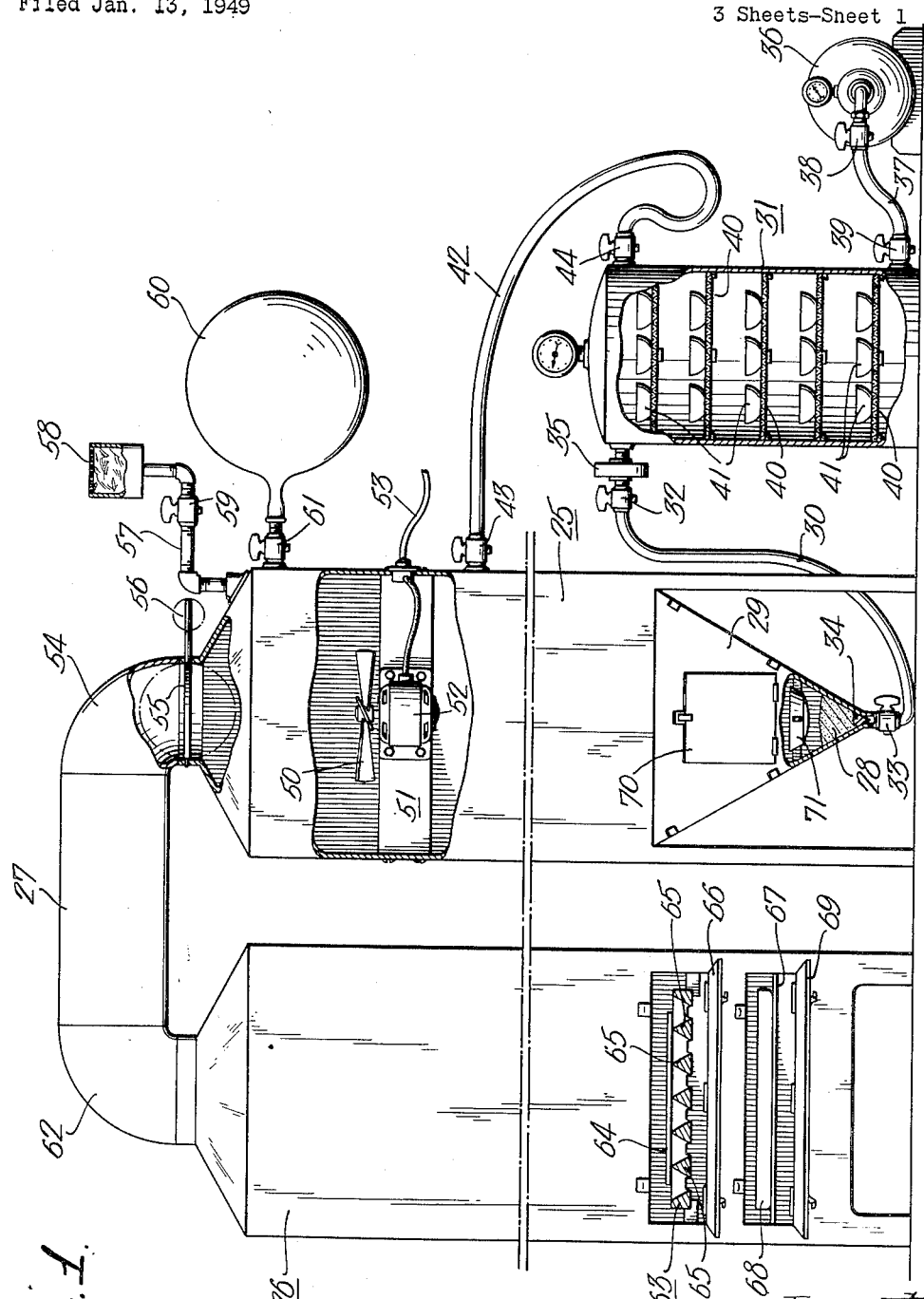
Fig. 1 is a schematic view in elevation, with sections partly broken away, of my improved dust box and agitating apparatus useful in carrying out the methods of my present invention.
Figure 13:
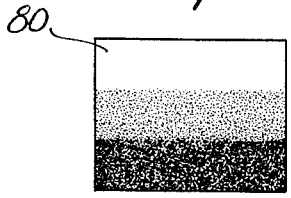
Fig. 13 represents an object to be photographically reproduced, said object having light, medium and dark areas thereon.

The improved grain screen is prepared by means of a "dual" dust box in which fine particles of carbon or similar material are agitated and collected on the light-sensitive emulsion covered surface of an unexposed emulsion-carrying plate. For purposes of consistency, the dust utilized in the dust box will be referred to as carbon, although satisfactory results may be obtained with asphaltum, dyed starch, or any other dry finely powdered material. Agitation of the carbon particles is effected by means of dry compressed air drawn through a desiccator containing a deliquescent or hygroscopic substance such as calcium chloride. A fan in one compartment of the dust box may be employed to condition the air to remove moisture. The second compartment comprises an airtight receptacle into which the carbon particles are received by means of an overhead connection with the first compartment. The unexposed plates on which the grain screen is to be formed, are introduced near the bottom of the second compartment and are permitted to remain in the compartment for a controlled length of time in order to collect only fine grains of the carbon on the emulsion covered surface thereof. The plate is then withdrawn and subjected to a short exposure, whereupon it is re-inserted into the cabinet and additional fine particles are allowed to settle on the emulsion covered surface of the plate for a given period of time. This procedure is repeated several times. The resulting effect is such that all areas of the plate (more accurately the emulsion on the surface of the plate) which are not covered by carbon particles become successively darker on each subsequent exposure, whereas further exposure of any part of the emulsion on which a carbon particle falls is thereby arrested.

It will be understood that the end result achieved by the above methods may be approximated in a variety of ways. However, I have found that the step-by-step exposure and re-exposure of the light-sensitive emulsion of the plate is an important feature of the invention and enables superior results to be obtained. The plate described above will be a negative or can be said to have a negative grain exposure. A positive grain screen from the same plate may be obtained by means of a contact exposure from the previously prepared negative using the same light source. Either the positive or the negative grain sceen may be used, as desired.

When the grain screen has been prepared in accordance with the above procedure, the plate is developed and fixed and is then ready to be used, in negative or positive form, in a variety of ways to provide a greatly improved result in the gravure and in the offset process. For example, unexposed negatives may be momentarily exposed to the grain screen and a negative so prepared may be successfully exposed to the object in a camera, as will be described more fully hereinafter. The negative plates may be pre-exposed to uniform light through the grain screen and stored indefinitely until needed, thereby eliminating in many cases one step in the conventional process. Likewise, the grain screen can be printed on a positive before it has been exposed to the negative so that:

(a) The dry plate negative may be pre-exposed;

(b) The dry plate negative may be contact exposed in the camera while simultaneously making an exposure of the object;

(c) The positive plate may be pre-exposed;

(d) The positive plate may be contact exposed.

Referring now more particularly to the drawings, my improved screen is prepared by means of a carbon dust box (Fig. 1) which consists of an agitating chamber 25 and a precipitation chamber 26 interconnected by means of duct 27. Particles of fine carbon dust 28 are stored in a V-shaped bin 29 at the bottom of agitating chamber 25. Compressed air is introduced into the bottom of bin 29 by means of air line 30 connected to desiccator 31 and provided with suitable stop cocks 32 and 33. A check valve 34 in the bottom of the bin prevents undesired entry of carbon particles into line 30 when the compressed air has been turned off. If desired, a suitable filter 35 may also be introduced between the desiccator and the bin. Compressed air from any desired source such as air tank 36, is fed to the bottom of desiccator 31 by means of line 37 which is likewise provided with stop cocks 38 and 39. Desiccator 31 contains a plurality of shelves 40, 40 of foraminous material, such as screening.

In accordance with conventional practice, calcium chloride or other suitable deliquescent agent is placed in receptacles 41, 41 on shelves 40, 40. The disiccator 31 is also connected directly to agitating chamber 25 by means of air line 42 and stop cocks 43, 44.

A circulating fan 50 is positioned in the upper portion of agitating chamber 25 by means of bracket 51 and the fan is mounted on electric motor 52 having an electrical connection 53. The top of chamber 25 is conical in shape and exhausts into duct 27 through elbow 54 in which is mounted a suitable butterfly valve 54 operated by means of exterior handle 56. A convenient air outlet 57 from chamber 25 is provided with a filter 58 and stop cock 59. A conventional toy balloon 60 attached to the stop cock 61 makes a satisfactory compensator and pressure gauge for low pressures of 2 to 3 p. s. i.

The precipitation chamber 26 is connected to duct 27 by means of elbow 62 and is provided with a rack assembly 63 near the bottom of the chamber. The rack 63 is adapted to support a photographic plate 64 on triangular rails 65, 65 and access to the rack is provided by means of door 66. A second rack 67 supports a carbon collecting tray 68 (accessible through door 69) in such a manner that carbon particles falling past rails 65, 65 will be gathered in tray 68, whereupon the carbon may be transferred to bin 29 through trapdoor 70. Tray 68 is also used for calcium chloride to maintain the inside atmosphere of chamber 26 in a relatively dry state, and in practice the calcium chloride is inserted in chamber 26 approximately twenty-four hours before the apparatus is to be used.

In preparing the apparatus of Fig. 1, the air in the agitating chamber 25 should be conditioned for approximately one hour in order to reduce the moisture content of the air within the chamber to a minimum. This is accomplished by closing stop cocks 32 and 33 so that no carbon in bin 29 will be blown into the upper part of chamber 25. Stop cock 61 and exhaust cock 59 are both open. Air is then introduced into chamber 25 from tank 36 and desiccator 31 through air lines 37 and 42 (valves 43 and 44 being open) for a short period of time. During conditioning, butterfly valve 55 may be either open or closed. When the air in chamber 25 has become sufficiently conditioned, valves 44 and 43, as well as butterfly valve 55, are closed. Air is then introduced again into chamber 25, this time through valves 32 and 33, from tank 31 in which pressure is reduced to less than ten pounds. Fan 50 is started, and balloon pressure gauge 60 is opened to guard against excessive pressure. After a predetermined interval, valves 32 and 33 and then valve 59 are closed and fan 50 is stopped. After another similar interval, butterfly valve 55 is opened, both doors 66 and 69 being closed. Care must be exercised to see that the air pressure is not so great that the dust will violently enter chamber 26, since the purpose is to provide a gentle agitation uniformly throughout the chamber.

Depending upon the moisture content of the air, the conditioning process described above, prior to opening valves 32, 33, may be repeated any number of times to insure that the air be as dry as possible. After allowing sufficient time for the carbon particles to settle onto tray 68, the unexposed light-sensitive emulsion covered plate 64 is introduced onto rack 63 through door 66 and permitted to remain in the chamber for a predetermined time interval. The plate specified above may if desired, be a dry plate such as used in making the conventional half-tone negative. The plate 64 is then removed from the chamber and exposed to a lamp 72 which is connected to a conventional fractional-second timer 73, the light from said lamp impinging on the emulsion covered surface of said plate on all portions of said emulsion not covered by the carbon particles. The carbon is re-agitated and plate 64 re-introduced into chamber 26 to repeat the process, using shorter time intervals until the desired effect is achieved.

The repeated exposure of the light-sensitive emulsion covered plate first to the carbon and then to the light source, enables a grain to be produced on the plate which has dots of varying intensity and this is the feature that is primarily responsible for the greatly improved results of my invention.

Referring more particularly to Figs. 3-9, the preparation of the grain screen in the dust box will be fully explained. Plate 64 has the conventional glass portion 64a and a conventional half-tone, light sensitive emulsion 64b thereon forming a thin layer on one side of the glass 64a. In the views of Figs. 3-7, the light-sensitive emulsion and carbon particles have been greatly magnified in order to illustrate clearly what takes place in the process of producing the grain screen.

Fig. 3 illustrates the result of the first precipitation in chamber 26 and after the first exposure to lamp 72. Carbon particles 28a which are opaque to light, have protected portion of the light-sensitive emulsion 64b from action by the light so that the portions of said emulsion under particles 28a, 28a are unexposed.

Fig. 4 shows the plate 64 after the second precipitation of carbon in chamber 26 and after the second exposure to lamp 72. In this case, the original carbon particles 28a, 28a are undisturbed so that the light-sensitive emulsion beneath these particles continues to be unexposed. However, new particles 28b, 28b have fallen on the light-sensitive emulsion with the result that said emulsion under particle 28b is in effect "fixed" at the same exposure as the emulsion of Fig. 3. One of the particles 28b has fallen in such a way that it partly covers one of the original particles 28a. However, any portion of this last mentioned particle 28b extending beyond particle 28a prevents exposure of the emulsion underneath that portion.

Fig. 5 illustrates the relative exposures of the light-sensitive emulsion after the third precipitation of carbon and exposure to lamp 72. In this case, new particles 28c have fallen on the light-sensitive emulsion and these particles fix the emulsion thereunder at the same density as shown in Fig. 4. Particles 28a and 28b remain in the same position. In each successive step, the unprotected portions of the light-sensitive emulsion becomes successively more exposed as indicated by the increasing darkness of the shading in Figs. 3-7. Fig. 6 is comparable to Fig. 5 but with an additional deposit of carbon particles 28d, 28d. Here again, all portions of the light-sensitive emulsion 64b under the particles are retained in their previous state of exposure and all portions of said emulsion not fixed are shown as becoming increasingly darker. Fig. 7 shows the continued precipitation of carbon on the emulsion covered surface of the plate with new particles 28e, 28e added to those already accumulated thereon. The repetition of the process is continued until a very high range of exposures of various intensities has been provided.

Fig. 8 is a gray wash of homogeneous, uniform intensity and illustrates the results that may be achieved on each individual tone dot or exposed area of the grain screen. It will be understood that the gray of Fig. 8 may be varied all the way from white to black, in accordance with the procedure described hereinafter. Fig. 9 illustrates how the showing of Fig. 8 must be conveyed when it is necessary to employ completely black ink. Actually, the stippled areas of the exposed light-sensitive emulsion in Figs. 3-7 should be uniformly shaded as is Fig. 8. The stippling is used only to represent variation of intensity.

When the desired grain has been obtained on the screen as described above, the plate may then be developed and fixed at a temperature of approximately 63° F. The grain screen obtained in this manner is useful both for the gravure plate and the offset plate, as well as for industrial purposes in graining zinc or aluminum or other metals, or plastics or any material that may be used to take an impression from an original plate made with this screen. Examples of the advantageous ways of utilizing my improved grain screen will be described more fully hereinafter.

By way of explanation and with no intention of limiting the process of producing my improved grain screen plate, the following is illustrative of a procedure which I have found to provide very satisfactory results:

1. Condition the air in the agitating chamber 25 as described above, to remove moisture;
2. Check humidity in precipitation chamber 26;
3. Open line 30 and start fan 50;
4. Close line 30 and stop fan 50;
5. Allow carbon to enter and precipitate in chamber 26 for 23 minutes;
6. Insert the light-sensitive emulsion covered plate 64 through door 66 onto rack 63 with the emulsion covered surface facing upwardly;
7. Allow carbon to precipitate onto the emulsion covered surface of the plate for 25 minutes;
8. Remove plate;
9. Open line 30 and start fan 50;
10. Close line 30 and stop fan 50;
11. Allow carbon to enter and precipitate in chamber 26 for 23 minutes;
12. Insert plate 64 through door 66 onto rack 63 with the emulsion covered surface facing upwardly;
13. Allow carbon to precipitate onto the emulsion covered surface of the plate for 25 minutes;
14. Remove plate;
15. Open line 30 and start fan 50;
16. Close line 30 and stop fan 50;
17. Allow carbon to enter and precipitate in chamber 26 for 23 minutes;
18. Insert plate 64 through door 66 onto rack 63 with the emulsion covered surface facing upwardly;
19. Allow carbon to precipitate onto the emulsion covered surface of the plate for 25 minutes;
20. Remove plate;
21. Place plate in airtight container;
22. Transfer plate and container to exposure bench;

23. Expose plate to the lamp 72 for 0.4 second;
24. Open line 30 and start fan 50;
25. Close line 30 and stop fan 50;
26. Allow carbon to enter and precipitate for 20 minutes;
27. Insert plate 64 through door 66 onto rack 63 with the emulsion covered surface facing upwardly;
28. Allow carbon to precipitate onto the emulsion covered surface of the plate for 25 minutes;
29. Remove plate;
30. Open line 30 and start fan 50;
31. Close line 30 and stop fan 50;
32. Allow carbon to enter and precipitate for 20 minutes;
33. Insert plate 64 through door 66 onto rack 63 with the emulsion covered surface facing upwardly;
34. Allow carbon to precipitate onto the emulsion covered surface of the plate for 25 minutes;
35. Remove plate;
36. Open line 30 and start fan 50;
37. Close line 30 and stop fan 50;
38. Allow carbon to enter and precipitate for 20 minutes;
39. Insert plate 64 through door 66 onto rack 63 with the emulsion covered surface facing upwardly;
40. Allow carbon to precipitate onto the emulsion covered surface of the plate for 25 minutes;
41. Remove plate;
42. Place plate in airtight container;
43. Transfer plate and container to exposure bench;
44. Expose plate to the lamp 72 for 0.4 second;
45. Open line 30 and start fan 50;
46. Close line 30 and stop fan 50;
47. Allow carbon to enter and precipitate for 20 minutes;
48. Insert plate 64 through door 66 onto rack 63 with the emulsion covered surface facing upwardly;
49. Allow carbon to precipitate onto the emulsion covered surface of the plate for 25 minutes;
50. Remove plate;
51. Open line 30 and start fan 50;
52. Close line 30 and stop fan 50;
53. Allow carbon to enter and precipitate for 20 minutes;
54. Insert plate 64 through door 66 onto rack 63 with the emulsion covered surface facing upwardly;
55. Allow carbon to precipitate onto the emulsion covered surface of the plate for 25 minutes;
56. Remove plate;
57. Open line 30 and start fan 50;
58. Close line 30 and stop fan 50;
59. Allow carbon to enter and precipitate for 20 minutes;
60. Insert plate 64 through door 66 onto rack 63 with the emulsion covered surface facing upwardly;
61. Allow carbon to precipitate onto the emulsion covered surface of the plate for 25 minutes;
62. Remove plate;
63. Place plate in airtight container;
64. Transfer plate and container to exposure bench;
65. Expose plate to the lamp 72 for 0.4 second;
66. Open line 30 and start fan 50;
67. Close line 30 and stop fan 50;
68. Allow carbon to enter and precipitate in chamber 26 for 18 minutes;
69. Insert plate 64 through door 66 onto rack 63 with the emulsion covered surface facing upwardly;
70. Allow carbon to precipitate onto the emulsion covered surface of the plate for 25 minutes;
71. Remove plate;
72. Open line 30 and start fan 50;
73. Close line 30 and stop fan 50;
74. Allow carbon to enter and precipitate in chamber 26 for 18 minutes;
75. Insert plate 64 through door 66 onto rack 63 with the emulsion covered surface facing upwardly;
76. Allow carbon to precipitate onto the emulsion covered surface of the plate for 25 minutes;
77. Remove plate;
78. Open line 30 and start fan 50;
79. Close line 30 and stop fan 50;
80. Allow carbon to enter and precipitate in chamber 26 for 18 minutes;
81. Insert plate 64 through door 66 onto rack 63 with the emulsion covered surface facing upwardly;
82. Allow carbon to precipitate onto the emulsion covered surface of the plate for 25 minutes;
83. Remove plate;
84. Place plate in airtight container;
85. Transfer plate and container to exposure bench;
86. Expose plate to the lamp 72 for 0.4 second;
87. Brush off all carbon dust;
88. Develop and fix plate at 68° F.

It will be noted that the step in the above sequence which calls for placing the plate in an airtight container is intended to mean that under no circumstances must the carbon particles be disturbed from the time they are removed from the dust box, exposed to the light, and returned to the dust box. The absence of any air currents is, of course, essential in this connection as well as the exercise of extreme care in handling the plate. For this purpose, the carbon particles should not be disturbed in any way during the entire process until after the plate has been developed. Naturally, it will be understood that the entire procedure for preparing the grain screen takes place under dark red light in a suitable photographic dark room.

It will be understood that the 0.4 second exposure specified in the above procedure can be varied by means of changing the intensity of the light source as well as the distance of the light source. However, the exposure under these circumstances in all events is very slight.

The above completes the preparation of the improved grain screen. Having thus prepared the screen with variously intensified dots, I have found that it may be used very advantageously for a variety of purposes. In the first place, both positive and negative dry plates may be pre-exposed to uniform light through the grain screen by contact and then stored indefinitely for further use. Also, the dry negative may be contact exposed to the grain screen in the camera at the time the photograph is being made. The positive plate may also be contact exposed in the camera, but this latter process may in certain cases be impractical due to refraction. In color separation work, it has been found advantageous to use the grain screen in contact in the camera, that is, in contact with the dry plate during both exposures.

Referring now to Figs. 10–19, a typical manner of utilizing my improved grain screen in an improved photographic process will be described. The object 80 to be photographed is placed in front of the camera 81 and an exposure made on negative plate 82. For this purpose I use a conventional half-tone screen 83, a filter (not shown), and a cross-line stop 84 adapted to register with the cross lines on the half-tone screen for a flash exposure, which may then be followed by the regular standard screen exposure. When the half-tone exposure has been made on plate 82, the half-tone screen 83 is removed and a compensating plate of clear glass substituted for the half-tone screen. When the compensator has been substituted, a continuous tone exposure is made onto plate 82, thus providing a doubly exposed negative plate. In the above process, negative plate 82 has been pre-exposed to the finished grain screen 64, or if desired, the grain screen may be placed in the camera at the same time the double exposure is made.

Figure 14:
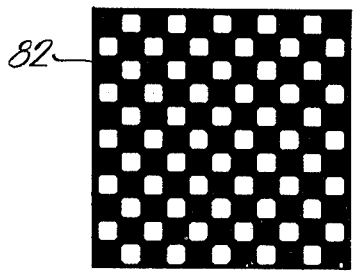
Figs. 14–16 are highly magnified areas of a negative plate after it has once been exposed to the object of Fig. 13.
Figure 15:
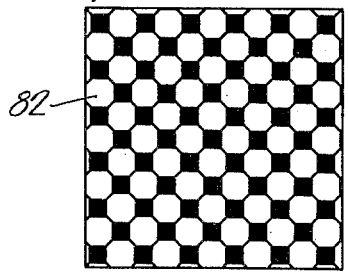
Figure 16:
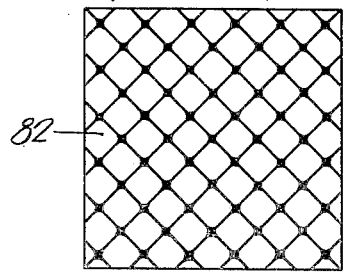

Figs. 14–16 are highly magnified representations of a portion of plate 82 after the half-tone exposure, Fig. 14 representing the light area of object 80, Fig. 15 the medium area, and Fig. 16 the dark area. Since these views represent the negative, the shading is exactly in reverse from the corresponding areas of object 80.

Figure 17:
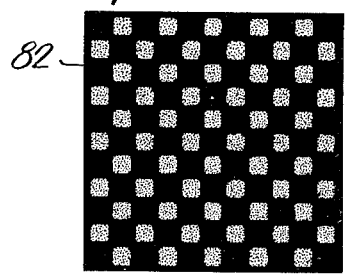
Figs. 17–19 represent the plate after the second exposure to the object of Fig. 13 and show the corresponding areas to Figs. 14–16 but with the added results of the second exposure.
Figure 18:
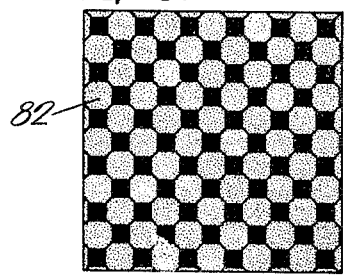
Figure 19:
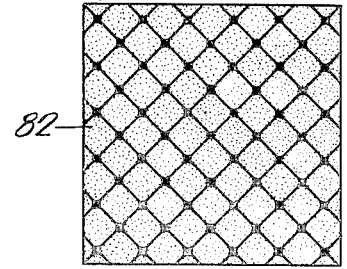

Figs. 17–19 represent the views of Figs. 14–16 after the negative has been subjected to both a continuous tone and a half-tone exposure so that a double exposure has been provided. It is immaterial whether the continuous tone precedes the half-tone exposure or vice versa. Corresponding to Figs. 14–16, Fig. 17 represents the light area, Fig. 18 the medium area, and Fig. 19 the dark area.

After the double exposure of negative 82, it may be removed from camera 81, developed and fixed, whereupon a contact exposure onto a positive plate 85 without the use of the camera is made (as shown in Fig. 12). It will be understood that the above process has been described in conjunction with a single negative but where colors are to be reproduced, the above process will be repeated except that in one case the filter above referred to and not shown will be orange, in another case green, in the third case purple, and in the fourth case light yellow or "K" for the black. The colors obtained respectively from these filters will, of course, be:

Orange _____ blue
Green _____ red
Purple _____ yellow
Light yellow or K _____ black In developing the positive plate 85, a special technique is employed, viz. the image is made "full" or "plus," and as the positive plate 85 is developed, the image and dots become clearer and clearer. Such sections of the image as appear to be in correct tonal value will be staged by means of a "resist" and the rest of the plate further developed or etched until the next section becomes of correct tonal value, whereupon the procss of staging and etching is repeated until all the various sections of the positive plate have the desired value. The advantages of this method are that the camera is used only once, i. e. for the making of the original set of double exposed separation negatives. The positive is made by contact, and since there is only one set of positives, there is no necessity for registering two positives on the carbon tissue.

It will be understood that in the double exposure process described above, it is not necessary that the half-tone exposure be made first and it is believed to be immaterial whether the continuous tone or the half-tone exposure takes place first. When the positive plate is developed and completely staged, it is ready for the carbon tissue in the case of the gravure process, or directly onto the metal plate in the offset process. However, for offset work, it may be desirable to omit the half-tone screen in conjunction with Fig. 10.

I have therefore, provided an improved grain screen and improved methods of using the grain screen which are especially advantageous in the gravure or carbon tissue reproduction process. The tedious necessity to register two positives on the carbon tissue has been reduced or entirely eliminated. Furthermore, the use of positive plates prepared in accordance with my improved method will be very beneficial in the etching of the copper plate or cylinder since the iron chloride can penetrate to better advantage.

Having thus described my invention, I claim:

1. The method of preparing a photographic grain screen which comprises the steps of inserting in a precipitation chamber an object having a light-sensitive emulsion on a surface thereof, causing substantially opaque dust particles to fall on said emulsion to cover portions thereof and to leave other portions of said emulsion uncovered by said dust particles, exposing said uncovered portions of said emulsion to a light source, re-inserting the object in the precipitation chamber, causing additional substantially opaque dust particles to fall on said emulsion over the first particles thereon and over additional portions of said emulsions, re-exposing the remaining uncovered portions of said emulsion to a light source, removing said dust particles from said emulsion, and developing the emulsion on the object to provide a grain screen having at least two areas of different intensity.

2. The method of preparing a photographic grain screen which comprises the steps of inserting an unexposed photographic plate having a light-sensitive emulsion on a surface thereof into a precipitation chamber, causing substantially opaque dust particles to fall on the emulsion on said unexposed plate to partially cover the said emulsion, removing said plate from said chamber, exposing the uncovered portions of said emulsion to a light source, re-inserting the plate into the precipitation chamber, causing additional substantially opaque dust particles to fall on said plate over the first particles and over additional portions of said emulsion, re-exposing the remaining uncovered portions of said emulsion to a light source, removing said dust particles from said emulsion, and developing the emulsion on said plate to provide a grain screen having at least two areas of different intensity.

3. The method of preparing a photographic grain screen which comprises the steps of conditioning a precipitation chamber to substantially remove moisture therefrom, agitating a supply of substantially opaque carbon dust particles, introducing a quantity of said agitated carbon dust particles into said precipitation chamber, causing the carbon particles to precipitate in said chamber, inserting an unexposed photographic plate having a light-sensitive emulsion on a surface thereof into said precipitation chamber, causing the carbon particles to continue to precipitate and to fall on the emulsion on said unexposed plate to partially cover the said emulsion, removing the plate from said chamber, exposing the uncovered portions of said emulsion to a light source, re-agitating the carbon particles in said precipitation chamber, causing the carbon particles to precipitate in said precipitation chamber, re-inserting the plate in the precipitation chamber, causing additional substantially opaque carbon particles to fall on said plate over the first particles thereon and over additional portions of said emulsion, removing the plate from the precipitation chamber, re-exposing the remaining uncovered portions of said emulsion to a light source, removing the carbon particles from said emulsion, and developing the emulsion on said plate to provide a grain screen having at least two areas of different intensity.

4. The method of preparing a photographic grain screen which comprises the steps of agitating a supply of substantially opaque dust particles, introducing a quantity of said agitated dust particles into a substantially moisture-free chamber, causing said particles to precipitate in said chamber, inserting an unexposed photographic plate having a light-sensitive emulsion on a surface thereof into said chamber, causing said dust particles to continue to precipitate and to fall on the emulsion covered surface of said unexposed plate to partially cover the said emulsion, removing the plate from said chamber, exposing the uncovered portions of said emulsion to a light source, re-agitating the dust particles in the chamber, causing the dust particles to precipitate in the chamber, re-inserting the plate in the chamber, causing additional substantially opaque dust particles to fall on said plate over the first particles thereon and over additional portions of said emulsion, removing the plate from the chamber, re-exposing the remaining uncovered portions of said emulsion to a light source, removing the dust particles from said emulsion, and developing the emulsion on said plate to provide a grain screen having at least two areas of different intensity.

5. The method of preparing a photographic grain screen which comprises the steps of agitating a supply of substantially opaque dust particles, introducing a quantity of said agitated dust particles into a precipitation chamber, causing the dust particles to precipitate in said chamber, inserting an unexposed photographic plate having a light-sensitive emulsion on a surface thereof into said chamber, causing the dust particles to precipitate and to fall on the emulsion covered portion of said plate to partially cover portions of the emulsion thereon, removing the plate from said chamber, exposing the uncovered portions of said emulsion to a light source, re-agitating the dust particles in the chamber, causing the dust particles to precipitate in the chamber, reinserting the plate in the chamber, causing additional substantially opaque dust particles to fall on said plate over the first particles thereon and over additional portions of said emulsion, removing the plate from the chamber, re-exposing the remaining uncovered portions of said emulsion to a light source, and removing the dust particles from said emulsion.

6. The process defined in claim 5 in which the steps of agitating the supply of substantially opaque dust particles, introducing the quantity of said agitated dust particles into the precipitation chamber, causing the dust particles to precipitate in said chamber, inserting the unexposed photographic plate into said chamber, causing the dust particles to precipitate and to fall on the emulsion covered portion of said plate, and removing the plate from said chamber, are repeated at least twice with the same plate prior to the step of initiallly exposing the uncovered portions of said emulsion to a light source.

7. The process defined in claim 5 in which the steps of re-agitating the dust particles in the chamber, causing the dust particles to precipitate in the chamber, reinserting the plate in the chamber, causing additional substantially opaque dust particles to fall on said plate, and removing the plate from the chamber, are repeated at least twice with the same plate prior to the step of re-exposing the remaining uncovered portions of said emulsion to a light source.

8. The process defined in claim 5 in which the steps of agitating a supply of substantially opaque dust particles, introducing a quantity of said agitated dust particles into a precipitation chamber, causing the dust particles to precipitate in said chamber, inserting an unexposed photographic plate into said chamber, causing said dust particles to precipitate and to fall on the emulsion covered portion of said plate, removing the plate from the chamber, exposing the uncovered portions of said emulsion to a light source, re-agitating the dust particles in the chamber, causing the dust particles to precipitate in the chamber, reinserting the plate in the chamber, causing additional substantially opaque dust particles to fall on said plate, removing the plate from the chamber, and re-exposing the remaining uncovered portions of said emulsion to a light source, are repeated at least twice prior to the step of removing the dust particles from said emulsion.

9. The process defined in claim 5 in which the steps of agitating the supply of substantially opaque dust particles, introducing the quantity of said agitated dust particles into the precipitation chamber, causing the dust particles to precipitate in said chamber, inserting the unexposed photographic plate into said chamber, causing the dust particles to precipitate and to fall on the emulsion covered portion of said plate, removing the plate from said chamber, and exposing the uncovered portion of said emulsion to a light source, are repeated at least four times prior to completion of the remaining steps of the process.

10. The method of preparing a photographic dry plate having a latent screen pattern thereon which comprises the steps of inserting in a precipitation chamber an object having a light-sensitive emulsion on a surface thereof, causing substantially opaque dust particles to fall on said emulsion to cover portions thereof and to leave other portions of said emulsion uncovered by said dust particles, exposing said uncovered portions of said emulsion to a light source, re-inserting the object in the precipitation chamber, causing additional substantially opaque dust particles to fall on said emulsion over the first particles and over additional portions of said emulsion, re-exposing the remaining uncovered portions of said emulsion to a light source, removing said particles from said emulsion, developing the emulsion on the object to provide a grain screen having at least two areas of different intensity, and exposing an unexposed photographic dry plate to uniform light through the grain screen formed on said object.

11. The method of preparing a photographic dry plate having a latent screen pattern thereon which comprises the steps of conditioning a precipitation chamber to substantially remove moisture therefrom, agitating a supply of substantially opaque carbon dust particles, introducing a quantity of said agitated carbon dust particles into said precipitation chamber, causing the carbon dust particles to precipitate in said chamber, inserting a first unexposed photographic dry plate having a light-sensitive emulsion as a surface thereof into said chamber, causing the carbon dust particles to continue to precipitate and to fall on the emulsion on said first unexposed dry plate to partially cover the said emulsion, removing said first plate from said chamber, exposing the uncovered portions of said emulsion to a light source, re-agitating the carbon particles in said precipitation chamber, causing the carbon particles to precipitate in said precipitation chamber, re-inserting said first plate in the precipitation chamber, causing additional substantially opaque carbon particles to fall on said first plate over the first particles thereon and over additional portions of said emulsion, removing said first plate from the precipitation chamber, re-exposing the remaining uncovered portions of said emulsion to a light source, removing the carbon particles from said emulsion, developing the emulsion on said first plate to provide a grain screen having at least two areas of different intensity, and exposing a second unexposed photographic dry plate to uniform light through the grain screen formed on said first plate.

12. The method of preparing a photographic dry plate having a latent screen pattern thereon which comprises the steps of agitating a supply of substantially opaque dust particles, introducing a quantity of said agitated dust particles into a substantially moisture-free chamber, causing said dust particles to precipitate in said chamber, inserting a first unexposed photographic dry plate having a light-sensitive emulsion on a surface thereof into said chamber, causing the dust particles to continue to precipitate and to fall on the emulsion on said first unexposed dry plate to partially cover the said emulsion, removing said first plate from said chamber, exposing the uncovered portions of said emulsion to a light source, reagitating the dust particles in said precipitation chamber, causing the dust particles to precipitate in said precipitation chamber, re-inserting said first plate in the precipitation chamber, causing additional substantially opaque dust particles to fall on said first plate over the first particles thereon and over additional portions of said emulsion, removing said first plate from the precipitation chamber, re-exposing the remaining uncovered portions of said emulsion to a light source, removing the dust particles from said emulsion, developing the emulsion on said first plate to provide a grain screen having at least two areas of different intensity, and exposing a second unexposed photographic dry plate to uniform light through the grain screen formed on said first plate.

HERMAN E. MEYER.

References Cited in the file of this patent

UNITED STATES PATENTS

| Number | Name | Date |
| --- | --- | --- |
| 1,466,821 | Eckert | Sept. 4, 1923 |
| 1,527,676 | Eckert | Feb. 24, 1925 |
| 2,150,805 | Meulendyke | Mar. 14, 1939 |
| 2,183,204 | Reynolds | Dec. 12, 1939 |
| 2,191,939 | Marx | Feb. 27, 1940 |
| 2,478,444 | Yule | Aug. 9, 1949 |